April 24, 1934.  C. P. HURLEY  1,955,745

RECEPTACLE

Filed Feb. 19, 1932

INVENTOR
Charles P. Hurley
By
His attorney

Patented Apr. 24, 1934

1,955,745

UNITED STATES PATENT OFFICE 1,955,745

RECEPTACLE

Charles P. Hurley, Caldwell, N. J., assignor to Aluminum Company of America, Pittsburgh, Pa., a corporation of Pennsylvania Application February 19, 1932, Serial No. 593,974

10 Claims. (Cl. 229—14)

This invention relates to receptacles of the general type which comprise an exterior casing and an expansible interior container.

An object of the invention is to provide a receptacle in which a relatively thin, fragile metallic foil interior contents-receiving member or container, which in itself does not present sufficient strength to prevent collapse in handling, is combined with a relatively stronger exterior protective casing to constitute a package especially adapted for storing, shipping, mailing and otherwise handling foods, liquids, and other materials.

Another object of the invention is the provision of a receptacle having an exterior protective casing and an interior expansible contents-receiving container which is suitable for the packaging of frozen foods, and the like.

A further object of the invention is to provide a relatively inexpensive form of sealed receptacle which is comparable to a metallic can, but which is light in weight and economical to manufacture.

Other objects will present themselves on consideration of the following specification in connection with the attached drawing in which.

The receptacle to which this invention relates comprises an exterior protective casing of relatively strong material, and an interior expansible contents-receiving member of plaited construction and preferably made of metallic foil or the like, assembled within said exterior casing. In the preferred form of the invention the interior expansible contents-receiving member is secured to and supported by the exterior casing and has a substantial portion of its operative containing walls, i. e. that portion of the walls of the interior expansible member in contact with the material to be packaged, spaced from the walls of its exterior protective casing to permit free expansion of the interior expansible member, together with its contents, without distorting the exterior casing. A closure member, in the form of a relatively stiff metal lid, made of aluminum or the like, is provided to extend into the interior expansible member a sufficient distance to clamp the same to its exterior casing, and a suitable outwardly projecting flange on the closure member is thereafter double-seamed to the receptacle to constitute a fluid-tight joint.

In this form, a receptacle is provided having maximum operative containing walls in that only that portion of the walls of the interior expansible contents-receiving member in direct contact with the inwardly extending closure member and the interior casing in the formation of the fluid-tight joint is employed for other than containing the materials to be packaged.

It is quite manifest that other forms of construction will suggest themselves to those skilled in this art. For example, a form of receptacle wherein the interior expansible member is permitted to rest upon the bottom of the exterior casing and is otherwise secured in spaced relationship with respect thereto, as described above, will fall within the spirit and scope of this invention.

Figure 1:
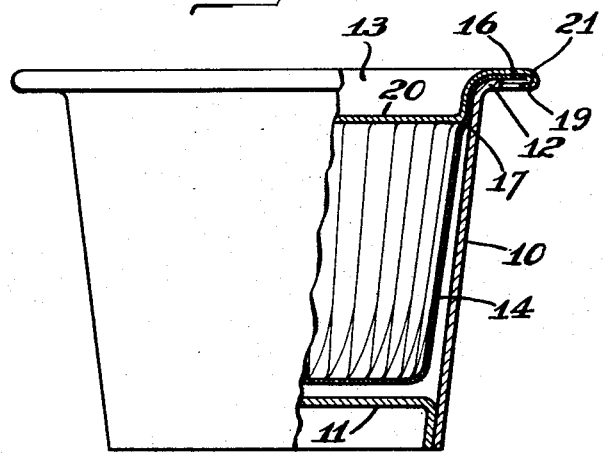
Fig. 1 represents, in elevation and part longitudinal section, a receptacle embodying the preferred form of my invention.
Figure 2:
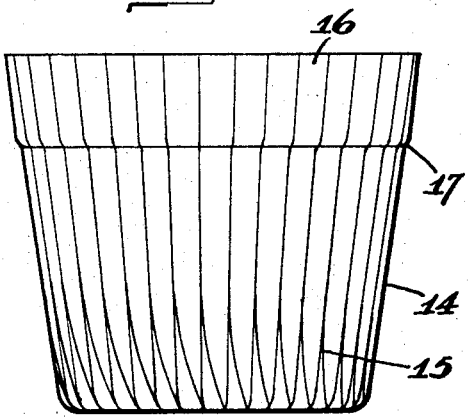
Fig. 2 represents, in elevation, a preferred form of an interior expansible contents-receiving member for use in said receptacle.

Having reference now to the drawing, in which like reference numerals designate similar parts, 10 represents an exterior casing which may be made of paper or similar fibrous material and is preferably so made for reasons of economy and light weight. As shown in Fig. 1, the upper edge of the exterior casing 10 is flared outwardly at 12 as a result of the downward pressure of the lid or closure member 13, during its application to the composite receptacle, and is provided with an adhesively secured bottom member or plate 11. An interior container 14 of metallic foil, which may be aluminum, tin, or the like, is provided within the exterior protective casing 10. This interior container is of the same general shape as the exterior casing, but appreciably smaller in size. Preferably it is formed from a single sheet of metallic foil and is plaited as shown at 15 in Fig. 2.

The interior container 14 is preferably provided at its open end with the flange 16, which forms a shoulder 17 with the circular wall of the interior member. While not essential, this flange provides, as will hereinafter be seen, a definite spacing of the interior contents-receiving container 14 from the exterior casing 10. In the assembly of the metallic foil container 14 within its exterior protective casing 10, a portion of the flange 16 is bent or flared outwardly, as shown in Fig. 1, to provide in combination with the shoulder 17 and the difference in taper of the walls of the members 10 and 14, a definite spaced relationship between the assembled containers.

A closure member 13, which is preferably made of relatively stiff metal, such as aluminum or the like, is provided with an inwardly extending portion 20 and an outwardly extending flange 21, the edge of which is curled inwardly as at 19. As initially placed on the assembled composite receptacle, the closure member 13 assumes the position shown in Fig. 1, the flange 16 of the interior member 14 projecting beyond the outwardly curled edge 12 of the exterior casing 10 and into the groove formed by the curled edge 19 of the peripheral flange 21 of the closure member. To complete the sealing of the receptacle two separate and distinct operations are considered preferable, and these are shown in Figs. 3 and 4.

Figure 3:
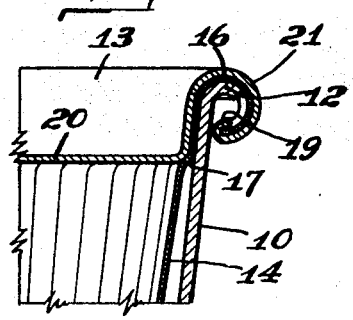
Fig. 3 represents an enlarged fragmentary sectional view illustrating what may be a preliminary step in the sealing of the closure member to the receptacle.
Figure 4:
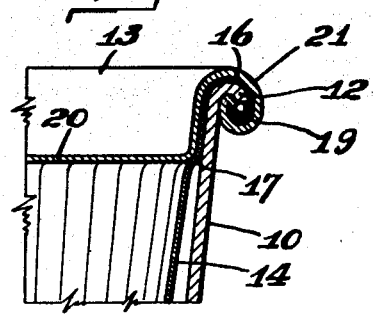
Fig. 4 represents an enlarged fragmentary sectional view illustrating a completed joint between the receptacle and a closure member.

The first step or initial operation in sealing the closure member 13 to its receptacle is illustrated in Fig. 3. In this step the peripheral flange 21 of the closure member 13 is compressed radially to crimp or tuck the closure member flange and the extending portion 16 of the interior vessel into contact with the exterior casing 10. Thus a metal-to-metal seal is obtained which, in combination with the clamping action of the inwardly extending portion 20 of the closure member with the interior member 14, will ordinarily insure a fluid-tight joint. However, as illustrated in Fig. 4, a second sealing operation may be performed whereby the single-seam or crimped joint of Fig. 3 is further compressed radially to turn inwardly on itself to form a double-seamed joint. In this latter joint, the material constituting the flared portion 12 of the exterior protective casing 10 is completely encased within a metal trough formed by the flange material 16 of the interior vessel 14, and is securely pinched between the oppositely opposed surfaces of the closure member flange 21. This construction is superior to the single crimped joint shown in Fig. 3 and eliminates the "wick" action of the exterior paper casing 10.

In the preferred practice of my invention, the substance to be packaged is placed within the interior expansible member 14, which has previously been assembled with its exterior casing as shown in Fig. 1. The closure member 13 is then placed on the composite receptacle and preferably sealed in place substantially as described, which operation secures and supports the interior expansible member in spaced relationship with respect to the exterior casing 10, and provides a condition of maximum operative containing walls for said interior expansible contents-receiving member.

My container is particularly adapted to the packaging of frozen foods, since the receptacle may be first filled and sealed and thereafter, with its contents, subjected to freezing temperatures. Because of the expansible nature of the interior container 14 and its spaced relationship with respect to the exterior casing 10, the contents on freezing do not rupture the walls of the contents-receiving receptacle or distort the exterior casing member. Furthermore the expansible nature of the interior container 14 relieves any undue pressure on the closure member 13 in the proximity of its double-seamed joint. This and similar apparent advantages render my receptacle extremely useful, particularly in connection with the newly developed art of packaging frozen materials.

Since various changes may be made in the above described specific details without departing from the spirit or scope of the invention, the invention is not to be considered as limited thereto except as defined in the appended claims.

What I claim is:

1. In a receptacle, an exterior protective casing, an interior expansible metal foil container of relatively smaller size, a metal closure member for said receptacle comprising an inwardly extending portion and an outwardly extending flange, said closure member extending into said interior container to clamp the same between said inwardly extending portion and the exterior protective casing and to provide spaced relationship therebetween over a substantial portion of the walls of said interior expansible container, and said outwardly extending flange of said closure member being double-seamed to said receptacle.

2. In a receptacle, an exterior protective casing, an interior container made of plaited metallic foil and a metal closure member securing the interior container in spaced relationship over a substantial portion of its containing walls with respect to its exterior protective casing.

3. A receptacle which comprises an exterior casing of relatively strong material, and an interior expansible member of plaited metallic foil construction, said interior member being relatively smaller in size than its exterior casing and provided with an outwardly flared flange at its open end in engagement with and extending beyond an outwardly flared flange at the open end of the exterior casing; a metal closure member provided with an inwardly extending portion and an outwardly extending peripheral flange, said closure member being associated with the open end of said receptacle in a manner to clamp the interior expansible member of plaited metallic foil between the inwardly extending portion of the closure member and the exterior casing member, and the flange of said closure member being crimped inwardly to enclose the outwardly extending flange of the exterior casing and compressed on itself to constitute a double-seamed metal-to-metal fluid-tight joint.

4. In a receptacle, an exterior protective casing, an interior plaited container made of metallic foil, and a metal closure member associated with said protective casing, said metal closure member in sealing engagement with said interior container.

5. In a receptacle, an exterior protective casing, an interior expansible container made of metallic foil, and a metal closure member associated with said protective casing, said metal closure member in sealing engagement with said interior container.

6. In a receptacle, an exterior protective casing, an interior plaited container made of metallic foil and a metallic closure member adapted to form a metal-to-metal seal with the container.

7. In a receptacle, an exterior protective casing, an interior plaited container made of metallic foil and a metallic closure member adapted to form a crimped metal-to-metal seal with the container and to engage the exterior casing to form a substantially unitary structure.

8. In a receptacle, an exterior protective casing, an interior plaited container made of metallic foil, a flanged closure member of relatively stiff metal, the flange of said closure member being adapted to be rolled outwardly and downwardly with a portion of said interior container to engage the outwardly-extending flange on said exterior member and to be crimped to form a metal-to-metal seal between said closure member and said interior container.

9. An all-metal container provided with a protective non-metallic casing, said all-metal container comprising a soft expansible body portion and a rigid closure portion with a double seam therebetween, said non-metallic casing secured to said container at its upper end, the walls of said casing wound into said double seam and tightly engaged thereby.

10. In a receptacle, an exterior protective casing of relatively rigid material, an interior expansible metal foil container of smaller size, and a closure member of relatively stiff metal, said interior expansible foil container shouldered near the upper end of the receptacle to space the body portion of the foil container from the walls of said casing while allowing tight-pressed engagement between said foil container and said casing walls at the upper end of the receptacle, said closure member having an upwardly extending flange engaging said foil container and maintaining the aforesaid tight-pressed engagement between said foil container and said casing walls at the upper end of the receptacle, whereby the upper end of said foil container is tightly secured between said upwardly extending closure flange and said casing walls, said upwardly extending closure flange and the adjacent portions of said foil container and said casing walls flanged outwardly and downwardly, and said downwardly flanged portions of said closure member and said foil container turned inwardly and upwardly against the exterior walls of said casing, the bead thus formed pressed tightly against said exterior walls to form a seam characterized by the provision of a metal-to-metal seal between said foil container and said closure member and serving to completely envelop and conceal the upper edge of said casing, the stiff metal closure member compressing the upper ends of the foil container and the casing between said upwardly extending flange and the upwardly extending portion of said bead.

CHARLES P. HURLEY.